United States Patent [19]

Green

[11] Patent Number: 4,879,152

[45] Date of Patent: Nov. 7, 1989

[54] COMPOSITE PANEL STRUCTURE

[76] Inventor: Patrick H. Green, 29 Montressor Drive, Willowdale, Ontario, Canada, M2P 1Y9

[21] Appl. No.: 310,661

[22] Filed: Feb. 15, 1989

[51] Int. Cl.$^4$ .............................................. B32B 3/12
[52] U.S. Cl. ..................................... 428/73; 156/286; 428/116; 428/117; 428/118
[58] Field of Search ................ 428/73, 116, 117, 118; 156/286

[56] References Cited

U.S. PATENT DOCUMENTS

| | | | |
|---|---|---|---|
| 2,833,004 | 5/1958 | Johnson et al. | 428/73 X |
| 2,839,442 | 6/1958 | Whitaker | 428/73 X |
| 3,575,756 | 4/1971 | Maus | 156/286 X |
| 3,630,813 | 12/1971 | Allen | 428/117 X |
| 3,703,422 | 11/1972 | Yoshino | 156/286 X |
| 3,970,324 | 7/1976 | Howat | 428/117 X |
| 4,315,050 | 2/1982 | Rourke | 428/116 |
| 4,353,947 | 10/1982 | Northcutt | 428/116 |
| 4,478,659 | 10/1984 | Hall | 428/116 X |

FOREIGN PATENT DOCUMENTS 1467766   3/1977   United Kingdom ................ 428/117

*Primary Examiner*—Henry F. Epstein
*Attorney, Agent, or Firm*—D. Ron Morrison

[57] ABSTRACT

The invention includes a composite panel and a method for manufacturing it. The panel has a smooth polyester plastic face, a first fiberglass reinforced polyester layer adjacent to the smooth face, a honeycomb structure core of polypropylene plastic with one face adhered to the first polyester layer, and a second fiberglass reinforced polyester layer adhered to the second face of the core. The panel is manufactured by assembling the components in a series of steps and curing the polyester layers in sequence on a flat horizontal mold.

12 Claims, 2 Drawing Sheets

COMPOSITE PANEL STRUCTURE invention relates to a composite panel structure and to a method of manufacturing it. More particularly the invention relates to a lightweight composite panel structure having fiberglass reinforced resin faces and a lightweight honeycomb core having thin honeycomb cell walls of polypropylene resin. The invention includes also a modification of the basic panel which includes a border of wood around the perimeter of the honeycomb core, and a modification which includes foamed plastic insulation in the honeycomb cells.

Numerous earlier patents have disclosed composite panel structures having a honeycomb core. However none of these have disclosed nor suggested the manufacture of panels having the structure, strength, and possible size of the panels of the . present invention. Thus U.S. Pat. No. 2,833,004 of D. R. Johnson et al issued May 6, 1958 discloses a composite type flush door structure having a wooden frame around its perimeter, a honeycomb core, and plywood, fiber board, or hard board facings covering the frame and honeycomb faces. Such doors have dimensions less than two or three meters. For decorative purposes the facings and edges of the frame are covered with a thin skin or sheet of plastic or metal cemented to the .outside of the facings. Similarly U.S. Pat. No. 2,839,442 of R. W. Whitaker issued June 17, 1958 discloses a lightweight structural panel having a perimeter strip of edging around the perimeter of an open cell core of corrugated or honeycombed paper. The open cells of the honeycomb core are sealed by a thin continuous film of thermosetting resin which is applied to the two faces of the core from a thin metal sheet and cured in a mold. Subsequently a laminate of fibrous reinforcing material and resin is applied to the faces and edges of the frame and core in a die or mold which is electrically heated to cure the resin with the laminated panel being pressed in the die during curing. The need for a die or mold that entirely enclosed the panel seriously restricts the size of panel that can be manufactured economically. Likewise U.S. Pat. No. 3,630,813 of J. W. Allen issued Dec. 28, 1971 discloses a composite panel having a rigid metal cellular (honeycomb) core with impact-absorbing filler material of cured, mixed, cellulosic fiber and thermosetting resin binder filling the cells of the core. In a modification of that invention, the core and excess filler material have a layer of fiberglass cloth bonded to the upper and lower faces of the panel by the thermosetting resin when the panel is being formed in a hot press mold to cure the thermosetting resin. Again the need for a mold that entirely encloses the panel seriously restricts the size of economically manufactured panels.

None of the foregoing or other disclosures in the art of manufacturing composite panels is known to have suggested panel structures having widths or lengths greater than normal building panels, which most commonly are of a size of four by eight feet (1.22 by 2.44 meters). The panels of the present invention specifically include panel sizes up to twelve feet by fifty feet (3.66 meters by 15.24 meters) or greater, which can be readily manufactured with simple equipment. Panels of such dimensions are ideal as walls for trucks and truck trailers, in which the entire sidewall of a truck or trailer can be made from a single panel.

The invention thus consists in a composite panel having:

(1) a first face comprising a first layer of cured polyester resin bonded to (2) a second layer of cured polyester resin having embedded therein a fabric of woven roving fiberglass bonded by said second layer of cured resin to one side of (3) a polypropylene core layer of thin wall, open cell, honeycomb structure, in turn bonded to (4) a second face comprising a third layer of cured polyester resin having embedded therein a fabric of woven roving fiberglass, said third layer of cured polyester resin bonding said second face to the second side of said polypropylene core layer, and (5) means to prevent resin from said second and third layers from penetrating through the cells of the honeycomb structure core.

The invention further consists in the method of manufacturing the composite panel described immediately above, said method comprising:

(1) forming a thin continuous first layer of curable liquid unsaturated polyester gel coat resin on the top of a flat smooth, substantially level mold;

(2) curing said first layer to a hard outer first facing for the composite panel;

(3) forming a second continuous and thicker layer of a second curable liquid unsaturated polyester resin on top of the total area of said first layer;

(4) embedding a first continuous fabric layer of woven roving fiberglass in said second layer of liquid resin to cover the area of said first facing;

(5) laying abutting sections of a thin wall, open cell, polypropylene honeycomb structure in said second layer of liquid resin on top of said first fabric layer to cover the area thereof, said sections of honeycomb structure having means on each open cell face to prevent penetration of said second liquid resin through said open cells;

(6) covering the mold with a flexible air impervious resin film of polyethylene or polyvinyl chloride nonadherent to cured polyester resin to form an airtight cover over the mold;

(7) evacuating air from the mold under the said cover while said second layer of polyester resin is cured;

(8) removing the said cover from said mold;

(9) forming a third continuous layer of said second curable liquid unsaturated polyester resin on top of the upper face of the honeycomb structures;

(10) embedding a second continuous fabric layer of woven roving fiberglass in said third layer of liquid resin to cover the area thereof;

(11) curing said third layer of resin, then removing the composite panel from the mold.

The curable liquid unsaturated polyester resins referred to herein are those resin solutions commonly used in the manufacture of fiberglass reinforced plastic materials, and generally comprise polyesters of unsaturated dibasic acids and dihydric alcohols in solution in a polymerizable liquid monomer, usually styrene. They are readily available from a number of manufacturers of such resins.

The preferred means to prevent penetration of the second and third layers of curable liquid polyester resin through the cells of the honeycomb structure, during manufacture of a composite panel as described above, is to have a thin mat of non-woven, randomly oriented fiberglass lightly adhered to the open ends of the cells on each face of the honeycomb structures. Such a thin mat of non-woven fiberglass, for example 0.1 to 0.2 inches (2 to 5 mm) in thickness, permits penetration of liquid polyester resin layers therethrough to the edges of the open cells of the honeycomb structures, so that the honeycomb structures become firmly adhered to the resin layers when the latter are cured, but impedes the flow of liquid resin sufficiently to prevent it from filling the open cells. The open cells thus are kept substantially free of cured resin, thereby minimizing the amount of polyester resin required to manufacture the panel and also maximizing the light weight advantage of an open cell honeycomb structure. Another means to prevent penetration of the second and third layers of curable liquid polyester resin through the cells of the honeycomb structure during manufacture of a composite panel as described above is to have the honeycomb cells filled with low density foamed plastic before the honeycomb structures contact the liquid polyester resin layers. The light weight, low density, foamed plastic, for example polyurethane foam or polystyrene foam, increases the weight of the honeycomb structures only slightly, and does significantly increase the thermal insulating properties of the completed panel as well as preventing liquid polyester resin from penetrating through the cells of the honeycomb structure.

BRIEF DESCRIPTION OF THE DRAWINGS

A better understanding of the invention and its scope may be ascertained from the following description thereof and the accompanying drawings in which.

Figure 1:
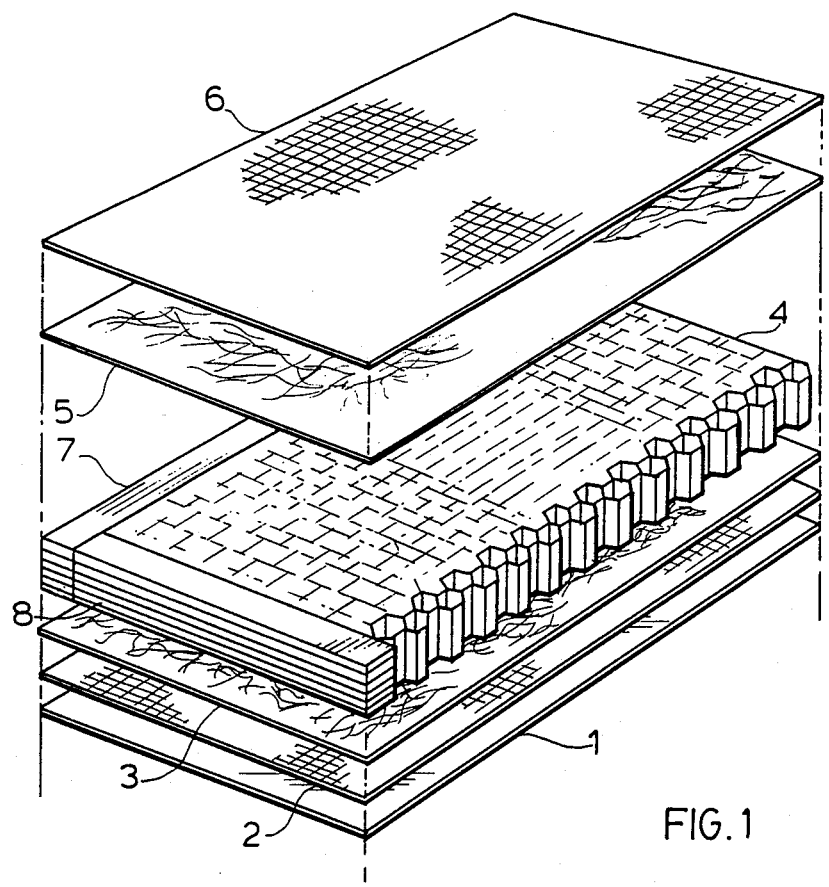
FIG. 1 illustrates the sequence of the various layers which are assembled to form the panel of one embodiment of the invention.

Turning now to the details of the various figures of the drawings, in FIG. 1 illustrating the elements to be assembled into a panel, 1 represents an outer facing layer of cured, unsaturated, polyester gel coat resin, which is formed on the smooth face of a flat level mold as will subsequently be described with reference to FIG. 3. This facing layer is usually referred to in the fiberglass reinforced plastics industry as a gel coat. Adjacent the facing layer or gel coat is a fabric layer of woven roving fiberglass, 2, which, during assembly of the panel, is embedded in a liquid layer of uncured unsaturated polyester resin formed on top of the outer facing layer. Elements 3 and 5 are lower and upper thin mats of non-woven, randomly oriented fiberglass, each of which is lightly adhered to a respective face of a thin wall, open cell, polypropylene honeycomb core, 4, prior to assembly of a panel. On top of the upper thin mat of non-woven fiberglass 5, is another fabric layer of woven roving fiberglass 6, which, during assembly of the panel, is embedded in another liquid layer of uncured unsaturated polyester resin formed on top of the upper thin mat, 5, of randomly oriented fiberglass. Optionally, around the four sides of the honeycomb core there may be edge strips of wood having substantially the same thickness as the honeycomb core. Such strips conveniently may be made of plywood. Only two such strips, 7 and 8, are shown in FIG. 1 for clarity of illustration, but normally strips around all four edges of the core would be used if any are used. The wooden strips serve primarily as a convenient and stronger base or foundation to hold nails, screws, bolts, or other fasteners used to anchor or fasten the panel to other adjoining elements to which the panel is to be attached.

Figure 2:
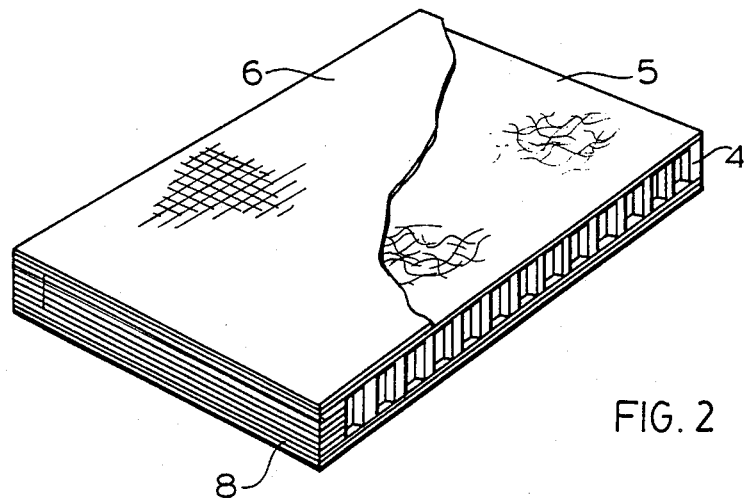
FIG. 2 illustrates a completed panel, partly cut away to show an interior layer.

FIG. 2 illustrates an isometric view of an assembled panel, having the essential elements of FIG. 1.

Figure 3:
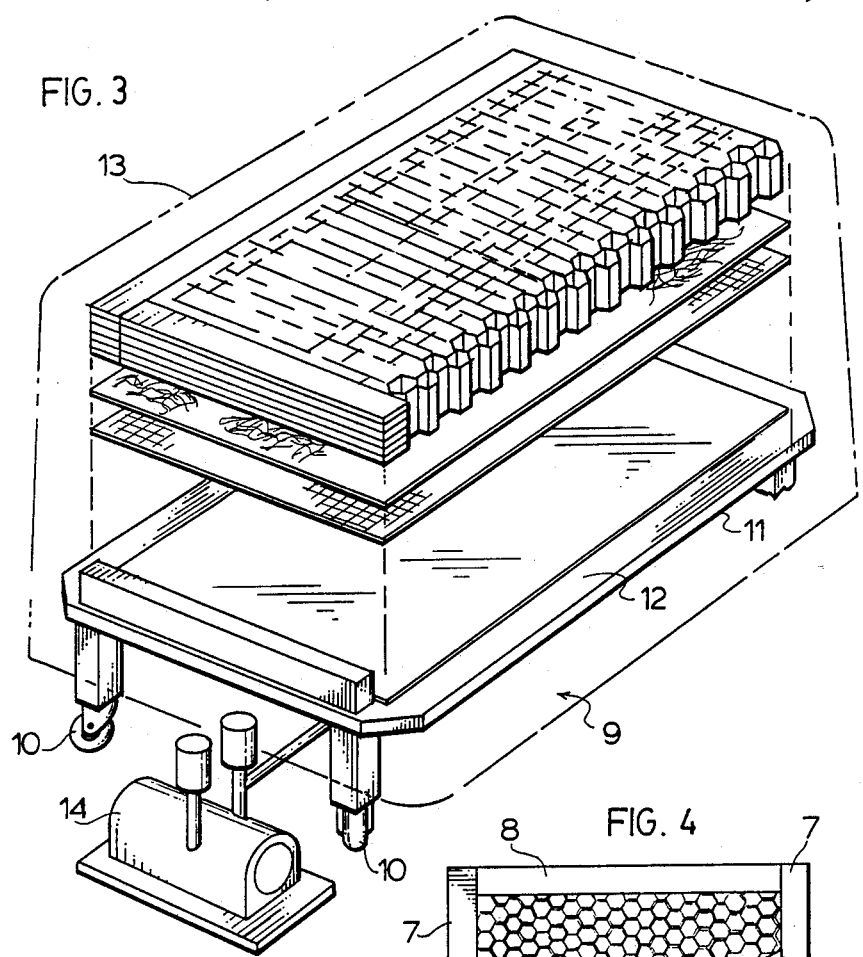
FIG. 3 illustrates typical apparatus suitable for assembling a panel, with some of a panels components being assembled thereon.

FIG. 3 illustrates a mobile mold, indicated generally as 9, most conveniently mounted on a frame, 11, having castor wheels, 10, to facilitate movement of the mold as large panels are being assembled. The critical part of the mold is the large, flat, smooth, horizontal surface, 12. Preferably, the horizontal mold surface is treated or coated with a release agent, for example a wax, to facilitate separation of the mold from the panel when the latter is complete. The mold surface should be clean and free of cracks and flaws to obtain panels with a blemish-free face. To assemble a panel of the invention with apparatus as illustrated in FIG. 3, the following method is preferred.

First, a uniform thickness liquid gel coat polyester resin, generally of 10 to 20 mil (0.25 to 0.51 mm) thickness, preferably 15 mil (0.37 mm) thickness, having area dimensions slightly greater than the desired length and width of the desired outer facing layer 1 is formed on the mold. This can be coated on the mold in any convenient way, for example by brushing, roller coating, doctoring, or calendering, but most conveniently is done by spraying gel coat resin solution on the horizontal surface from above as a mobile mold is moved continuously and uniformly through a spray booth under a vertical spray. When the gel coat has been formed on the mold, it is allowed to cure. The formation of a gel coat on a mold in this manner is a procedure well known in the art of preparing fiberglass reinforced plastic articles.

When the gel coat has cured, which, depending on the ambient temperature and curing catalyst employed in the gel coat, generally requires between 10 and 30 minutes, usually about 15 minutes, the mobile mold again is moved continuously and uniformly through the spray booth and a second curable liquid polyester resin layer is applied over the cured surface of the gel coat. This second liquid resin layer is applied at a uniform thickness between substantially 20 and 50 mil (0.51 and 1.27 mm), preferably substantially 30 mil (0.76 mm). As soon as this resin layer has been applied, a layer of woven roving fiberglass is laid in the liquid resin to cover the entire liquid layer, then the fiberglass is gently worked to ensure that the woven roving is entirely wetted by the liquid layer. Immediately after the woven roving is thoroughly wetted by the resin, sections of thin wall, open cell, polypropylene honeycomb, each section having a thin mat of non-woven, randomly oriented fiberglass lightly adhered to each open cell face, are laid in the liquid resin on top of the woven roving. The polypropylene honeycomb sections are arranged to cover the entire area of the woven roving, unless it is desired to utilize the option of having wooden edges around the core of the finished panel. If this option is desired, a perimeter around the honeycomb sections is formed with strips of wood, plywood, or other desired wood composite so that the honeycomb and wooden perimeter together cover the entire area of the woven roving to form the core of the finished panel.

As soon as the honeycomb sections, and the wooden perimeter strips if they are to be included, are in place on the second liquid resin layer, the mold and the layers assembled thereon are covered with a sheet of flexible, air impervious, smooth resin film of polyethylene or polyvinyl chloride which is non-adherent, or at most only weakly adherent, to cured polyester resin. Such a sheet is shown in dotted lines as 13 in FIG. 3. Once it is draped over the mold it is fastened thereto to form an airtight seal over the assembled layers and air is evacuated from under the sheet with a vacuum pump, 14. Pumping of the vacuum is maintained while the second liquid resin layer cures. Because of the vacuum under the sheet, atmospheric pressure above the sheet presses the latter down and forces the assembled layers into intimate contact with the liquid resin while the latter cures which, depending on the ambient temperature and the curing catalyst employed in the second polyester resin layer, also generally requires between 10 and 30 minutes, usually about 20 minutes. Under the vacuum, the liquid polyester resin penetrates the thin mat of randomly oriented fibreglass and wets the bottom edges of the polypropylene honeycomb cells to adhere firmly and securely to the cells when the resin cures.

Once the second liquid resin layer has cured, the vacuum is disconnected and the cover sheet is stripped from the mold. Because the cured polyester resin does not adhere firmly to polyethylene or polyvinyl chloride, the cover sheet is easily stripped manually from the assembled layers and any exposed polyester resin that may have been squeezed from between them into contact with the cover sheet. It is surprising and completely unexpected that the polyester resin adheres so firmly to the cell walls of the polypropylene honeycomb, when it exhibits little or no adhesion to polyethylene.

Once the cover sheet has been removed, the top thin mat of non-woven randomly oriented fiberglass on top of the honeycomb sections, and the top face of the wooden perimeter strips if these are present, are covered with a third layer of curable liquid polyester resin, most conveniently by again moving the mobile mold continuously and uniformly through the spray booth while spraying the liquid resin to form a third liquid resin layer of uniform thickness between substantially 20 and 50 mil (0.51 and 1.27 mm), preferrably substantially 30 mil (0.76 mm) thickness. As or when this layer is formed, another layer of woven roving fiberglass cloth is embedded therein and the liquid resin allowed to cure at ambient temperature. Again depending on the ambient temperature and the curing catalyst employed in the third polyester resin layer, the curing time required is generally between 10 and 30 minutes, usually about twenty minutes. When this cure is complete, the completed panel is removed from the mold and the edges can be trimmed with an appropriate cutter to bring the completed panel size down to exact desired dimensions.

The thickness of the polypropylene honeycomb core can vary in accordance with the desired thickness of the finished panel, and generally is in the range of 0.5 to 3.0 inches (13 to 76 mm). The area of individual cells in the honeycomb also can vary, and generally the cells are four sided with sides of between 200 and 400 mil (5.1 and 10.2 mm) long. However, five or six sided honeycomb cells also can be used. When a wooden perimeter around the honeycomb core is desired, it preferrably is of substantially the same thickness as the thickness of the core, although it can be slightly thicker or slightly thinner. The width of the perimeter strips, when used, also may vary, and conveniently can range between for example one and eight inches (2.5–20 cm), frequently depending on the particular requirement for fastening the edge of the panel to an adjoining structure; most conveniently strips between two and five inches (5 and 12.5 cm) are used.

When air is being pumped out from under the cover sheet during curing of the second liquid polyester resin layer, it is important that a vacuum of at least substantially 20 inches (51 cm) of mercury be arranged, or that a pumping capacity of substantially at least 12.5 cubic feet per min. (1.2 cubic meters per minute) be provided, so that vapors from the curing resin will be removed and the cover will be pulled tightly against the assembled layers and force them into firm contact with the curing resin to form solid adhesive bonds, both vertically and horizontally.

Figure 4:
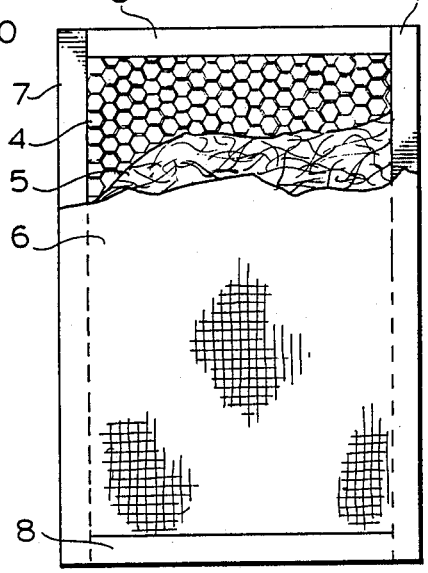
FIG. 4 illustrates another assembled panel, also partly cut away, showing a wooden perimeter surrounding the honeycomb core; and, FIG. 5 illustrates a small section of a panel, partly cut away, showing honeycomb cells filled with lightweight foamed plastic.
Figure 5:
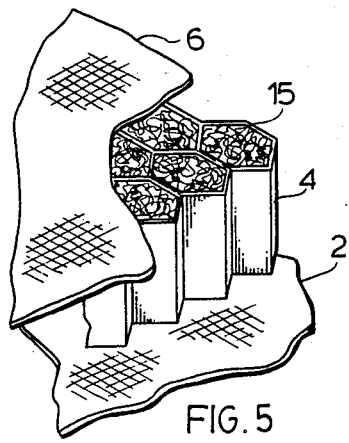

FIG. 4 is a top view of an assembled panel partly cut away, having wooden side and end edge strips 7 and 8 respectively. FIG. 5 shows a small section of a panel with no fiberglass mat on the faces of the honeycomb core, 4, but having light weight foamed plastic insulation, 15, in the open ended cells of the honeycomb, as the means which prevented liquid polyester resin from penetrating through the honeycomb cells during assembly of the panel; the insulation also, of course, improves the thermal insulating capacity of the panel without adding significantly to the weight of the panel. The density of the foamed insulation naturally is greater than that of air which it replaces in the cells of the honeycomb, and preferably is in the range of 1.7 to 2.1 lb/cuft (0.0272 to 0.0336 g/cc), but can be any value provided by the usual commercial foamed plastic insulating materials, for example foamed polyurethane and foamed polystyrene.

The size of composite panels that are readily manufactured by the method as just described can readily vary in width up to twelve feet (3.66 meters) and more, and in length up to 50 feet (15.24 meters) and more, being limited only by the size of the mold and other equipment required to assembly the composite panels. A common length of semi-trailers in North America is 48 to 50 feet, and semi-trailer side walls nine to ten feet high and 48 to 50 feet long are readily made as a single composite panel of the invention by the method described herein. The thickness of the panels also can be varied by use of honeycomb cores of appropriate thickness, with thicker panels and with plastic foam insulation filling the honeycomb core cells preferred when greater thermal insulation performance of the panels is required. Roofs as well as walls of semi-trailers and truck bodies also can be made from single composite panels of the invention.

As is well known in the art of fiberglass reinforced plastic technology, the gel coat can be colored readily by incorporating desired pigments and colors into the liquid gel coat layer before it is applied to the mold as the first face of the composite panel of the invention. The gel coat provides this face of the composite panel with a smooth, glossy, opaque, and pleasing appearance that is easy to clean, maintain, and decorate with paint or decals for names, signs, pictures or advertising.

The panels are strong, having flexural strength as great as or greater than that of comparable panels of equal thickness having a core of solid plywood in place of a polypropylene honeycomb, and the weight of the panels is only about half what it would be having a solid plywood core.

The insulating value of the composite panels with air filled honeycomb cells is far greater than would be obtained with a panel having a solid plywood core, and the insulating value of panels of the invention with foamed plastic insulation in the honeycomb cells is even greater.

Besides truck and trailer walls and roofs, the panels of the invention also can be used in construction of large shipping containers and in building construction.

Numerous modifications can be made in the specific expedients described without departing from the invention, the scope of which is defined in the following claims.

What is claimed is:

1. A composite panel having:
   (1) a first face comprising a first layer of cured polyester resin bonded to
   (2) a second layer of cured polyester resin having embedded therein a fabric of woven roving fiberglass bonded by said second layer of cured resin to one side of
   (3) a polypropylene core layer of thin wall, open cell, honeycomb structure, in turn bonded to
   (4) a second face comprising a third layer of cured polyester resin having embedded therein a fabric of woven roving fiberglass, said third layer of cured polyester resin bonding said second face to the second side of said polypropylene core layer, and
   (5) means to prevent resin from said second and third layers from penetrating through the cells of the honeycomb structure core.

2. A composite panel as claimed in claim 1 in which the means to prevent resin from said second and third layers from penetrating the cells of the honeycomb structure is a thin mat of non-woven, randomly oriented fiberglass adhered to the open ends of the cells on each face of the honeycomb structure.

3. A composite panel as claimed in claim 1 in which the means to prevent resin from said second and third layers from penetrating the cells of the honeycomb is a filling of low density foamed plastic in the cells.

4. A panel as claimed in claim 2, and further having around the perimeter of the core layer, between the second and third layers of cured, polyester resin, edge strips of wood having substantially the same thickness as the honeycomb structure.

5. A panel as claimed in claim 4 in which the strips of wood are between two and five inches in width.

6. A panel as claimed in claim 3 and further having around the perimeter of the core layer, between the second and third layers of cured polyester resin, edge strips of wood having substantially the same thickness as the honeycomb structure.

7. A panel as claimed in claim 6 in which the strips of wood are between two and five inches in width.

8. A panel as claimed in claim 3 in which the foamed plastic in the cells is foamed polyurethane having a density in the range of 1.7 to 2.1 lb/cuft.

9. A panel as claimed in claim 3 in which the foamed plastic is foamed polystyrene.

10. A method of manufacturing a composite panel which comprises:
    (1) forming a thin continuous first layer of curable liquid unsaturated polyester gel coat resin on the top of a flat smooth, substantially level mold;
    (2) Curing said first layer to a hard outer first facing for the composite panel;
    (3) forming a second continuous and thicker layer of a second curable liquid unsaturated polyester resin on top of the total area of said first layer;
    (4) embedding a first continuous fabric layer of woven roving fiberglass in said second layer of liquid resin to cover the area of said first facing;
    (5) laying abutting sections of a thin wall, open cell, polypropylene honeycomb structure in said second layer of liquid resin on top of said first fabric layer to cover the area thereof, said sections of honeycomb structure having means on each open cell face to prevent penetration of said second liquid resin through said open cells;
    (6) covering the mold with a flexible air impervious resin film of polyethylene or polyvinyl chloride non-adherent to cured polyester resin to form an airtight cover over the mold;
    (7) evacuating air from the mold under the said cover while said second layer of polyester resin is cured;
    (8) removing the said cover from said mold;
    (9) forming a third continuous layer of said second curable liquid unsaturated polyester resin on top of the upper face of the honeycomb structures;
    (10) embedding a second continuous fabric layer of woven roving fiberglass in said third layer of liquid resin to cover the area thereof;
    (11) curing said third layer of resin, then removing the composite panel from the mold.

11. A method as claimed in claim 10 in which the means, on each open cell face of said sections of honeycomb structure, to prevent penetration of said second liquid resin through said open cells, is a thin mat of non-woven, randomly oriented fiberglass adhered to the open ends of the open cells.

12. A method as claimed in claim 10 in which the means on each open cell face of said sections of honeycomb structure, to prevent penetration of said second liquid resin through said cells, is a filling of low density foamed plastic with which the cells have been filled prior to laying the sections of honeycomb on said second liquid resin.

* * * * *